United States Patent
Woerdeman

(10) Patent No.: US 7,867,587 B2
(45) Date of Patent: Jan. 11, 2011

(54) LOW TEMPERATURE MOLDING PROCESS FOR MAKING SOLID BIODEGRADABLE ARTICLES

(75) Inventor: Dara L Woerdeman, Narberth, PA (US)

(73) Assignee: R&D Green Materials, LLC, Philadelphia, PA (US)

( * ) Notice: Subject to any disclaimer, the term of this patent is extended or adjusted under 35 U.S.C. 154(b) by 670 days.

(21) Appl. No.: 11/195,223

(22) Filed: Aug. 2, 2005

(65) Prior Publication Data

US 2006/0027941 A1 Feb. 9, 2006

Related U.S. Application Data

(60) Provisional application No. 60/599,215, filed on Aug. 5, 2004.

(51) Int. Cl.
*B29C 71/02* (2006.01)
*B29D 22/00* (2006.01)
*B32B 1/08* (2006.01)

(52) U.S. Cl. .............................. 428/34.1; 220/DIG. 30; 106/124.1

(58) Field of Classification Search ................ 428/34.2; 425/412; 264/129, 330
See application file for complete search history.

(56) References Cited

U.S. PATENT DOCUMENTS

| | | | | |
|---|---|---|---|---|
| 2,461,829 A | * | 2/1949 | Lowen | 106/156.31 |
| 2,567,980 A | * | 9/1951 | Tuomy et al. | 34/349 |
| 3,653,925 A | * | 4/1972 | Anker et al. | 426/302 |
| 3,692,535 A | * | 9/1972 | Norsby et al. | 426/335 |
| 4,172,054 A | * | 10/1979 | Ogawa et al. | 524/18 |
| 4,200,569 A | * | 4/1980 | Ladbrooke et al. | 530/359 |
| 5,160,368 A | * | 11/1992 | Begovich | 106/126.2 |
| 5,279,658 A | | 1/1994 | Aung | |
| 5,354,621 A | | 10/1994 | Liebermann | |
| 5,470,382 A | * | 11/1995 | Andou | 106/124.4 |
| 5,639,518 A | | 6/1997 | Ando et al. | |
| 5,665,152 A | * | 9/1997 | Bassi et al. | 106/145.1 |
| 5,688,448 A | * | 11/1997 | Shutov et al. | 264/54 |
| 5,711,908 A | * | 1/1998 | Tiefenbacher et al. | 264/232 |
| 5,716,440 A | | 2/1998 | Andou | |
| 5,738,805 A | * | 4/1998 | Chaundy et al. | 516/77 |
| 5,747,648 A | * | 5/1998 | Bassi et al. | 530/374 |
| 5,767,107 A | * | 6/1998 | Chaundy et al. | 514/54 |
| 5,922,379 A | * | 7/1999 | Wang | 426/138 |
| 6,045,868 A | | 4/2000 | Rayas et al. | |
| 6,310,136 B1 | * | 10/2001 | Wang et al. | 525/54.1 |
| 6,716,022 B2 | | 4/2004 | Sun et al. | |
| 6,818,245 B1 | * | 11/2004 | De Sadeleer | 426/656 |
| 7,048,975 B1 | * | 5/2006 | Tojo et al. | 428/34.3 |
| 7,332,214 B2 | * | 2/2008 | Ozasa et al. | 428/317.1 |
| 2004/0056388 A1 | * | 3/2004 | Padua et al. | 264/500 |
| 2005/0070703 A1 | * | 3/2005 | Muller et al. | 536/123 |

FOREIGN PATENT DOCUMENTS

EP 1066759 A1 * 1/2001
WO WO 2004/029135 A2 4/2004

OTHER PUBLICATIONS

Dara L. Woerdeman et al., Designing New Materials from Wheat Protein, Biomacromolecules, vol. 4 1262-1269 (2004).
Mitsuo Yasui et al., Gluten Plastic, Biodegradable, Polymeric Materials Encyclopedia, 1996, pp. 2830-2833, vol. 4, CRC Press, Boca Raton.

* cited by examiner

*Primary Examiner*—Rena L Dye
*Assistant Examiner*—Michele Jacobson
(74) *Attorney, Agent, or Firm*—Pepper Hamilton LLP

(57) ABSTRACT

The present invention is directed toward a process for making solid biodegradable articles from wheat gluten. Hydrated wheat gluten is provided in the form of a cohesive, elastic dough. The cohesive, elastic dough comprises at least 8% by weight wheat gluten and wherein the wheat gluten comprises a protein having a primary structure. The cohesive, elastic dough is formed into a shaped article and placed in an environment sufficient to remove excess water from the shaped article without modifying the primary structure of the wheat gluten protein, such that a solid biodegradable article results. The solid biodegradable articles of the present invention comprise at least 8% by weight wheat gluten.

2 Claims, No Drawings

LOW TEMPERATURE MOLDING PROCESS FOR MAKING SOLID BIODEGRADABLE ARTICLES

CROSS-REFERENCE TO RELATED APPLICATIONS

This application claims the benefit of U.S. Provisional Patent Application Ser. No. 60/599,215, entitled, "Low-Temperature Molding Process and Biodegradable Articles Prepared Therefrom," filed Aug. 5, 2004, which is hereby incorporated by reference in its entirety.

FIELD OF THE INVENTION

The present invention relates to a low temperature molding process. In particular, it relates to a low temperature molding process that is used to prepare solid biodegradable articles from wheat gluten.

BACKGROUND OF THE INVENTION

Waste disposal is a major global problem in the world today. The escalating population, coupled with the use of more polymeric materials, has resulted in the creation of large landfills that are filled with non-biodegradable materials. Efforts have been made to try to create more biodegradable materials. These efforts are primarily focused on preparing polymers that degrade when exposed to sunlight or to manufacture materials from starch and other plant proteins that will degrade in a relative short period of time under normal environmental or composting conditions of temperature, humidity, and the action of microorganisms.

Bassi et al. (U.S. Pat. No. 5,665,152) propose a method of forming solid, non-edible biodegradable, grain protein-based articles. A grain protein formulation is heated to a maximum temperature of up to about 80° C. to create a substantially homogeneous and flowable mixture which can be formed into solid biodegradable articles. The formulation includes from about 20-85% by weight of grain protein, from about 5-75% by weight starch, up to about 14% by weight water, from about 10-40% by weight plasticizer, and at least about 0.01 by weight of a reducing agent such as sodium bisulfite for cleaving disulfide bonds present in the grain protein. Optional ingredients such as fillers, fiber, lubricant/mold release agents and colorants can also be used. The formulations are heated under moderate temperature conditions, usually with shear, to create a substantially homogeneous and flowable formulation. Thus, in the context of injection molding, the preferred temperature conditions of molding assure essentially complete protein denaturation. Reducing agents are an important component of the formulations because they drastically improve the flow and mixing of the grain protein and also serve to enhance the final products in terms of appearance, mechanical properties and moisture resistance.

Rayas et al. (U.S. Pat. No. 6,045,868) describe a method wherein grain flour proteins are crosslinked with aldehydes and bleached with a bleaching agent to form crosslinked transparent polymers used as films for packaging. The process uses ethanol and water for the extraction at acidic or basic pH's and optionally heating with or without a reducing agent to provide the polymer to be bleached and crosslinked. More specifically, the method involves the separation of biopolymeric materials from grain flours to make plastic films by a solubilization process with selected solvents. Once separated, the grain flour biopolymers are crosslinked and plasticized to form a film-forming solution. A heating process is preferred in order to concentrate the film-forming solution and denature the flour protein prior to crosslinking and bleaching so that more protein interactions occur when the film is dried and stronger films are formed. The heating process must be in the range of 30° C. up to the boiling point of the solution, with a preferred range of 60° C., up to the boiling point.

Woerdeman et al. (WO 2004/029135 A2) describe a gluten polymer matrix, with tunable material properties, produced by using polythiol-containing molecules during the preparation process. The process for preparing the gluten polymer matrix comprises dispersing or mixing gluten in the presence of polythiol-containing molecules or combining gluten with polythiol-containing molecules in a gluten-dispersing mixture. In another embodiment of the invention, the process also comprises an isolation step which consists of precipitating the proteins or a fraction thereof, for example by changing the pH of the dispersion, by changing the concentration of one of the solvents used or by changing the ionic strength of the mixture. When compression-molding is performed, a minimum temperature of 100° C. and a minimum pressure of 2 bars for a minimum of 1 minute is required.

Aung (U.S. Pat. No. 5,279,658) describes a composition suitable for forming into shaped articles comprising flour, starch, and water. The flour, starch and water are each present in an amount such that the composition is rigid and stable over a predetermined temperature range. The composition preferably contains 40-80% by weight flour, 20-60% starch and 15-25% water. The flour and starch are obtained from natural cereal sources, such as corn, rice, potato, tapioca and wheat. The composition may be in pellet form or any other form suitable for employing in a process for preparing shaped articles. A mixture of flour and starch are prepared wherein the flour and starch have a uniform particle size. The mixture is heated and mixed under a sufficient pressure temperature and moisture content and for a sufficient period of time such that when the pressure is decreased the mixture expands to form a composition which when cooled is rigid and stable over a predetermined temperature. In the cooking phase, the sifted mixture, water and any coloring and flavoring agents are fed into an extrusion cooker at a feed rate of 2-7 Kg/hour and a nozzle ratio of 2:4 with a single or twin screw rotating at a speed of 90-220 rpm. The dough is mixed, kneaded and cooked with a moisture content of 15-35% at a temperature of 120°-200° C. and pressure of 200-300 psi. The pressure is reduced by venting resulting in expansion of the dough. The expanded hot dough is pressure injected into a form press which has a water-cooled die mold. The expanded hot dough fast cools in the form press at the surface of the cold die mold. The expanded packaging material is stamped to the correct thickness in the form press. The formed packaging material may then be coated with a water repellant material, dried in an oven and cooled in a cooling chamber.

An object of the present invention is to provide a low temperature molding process for preparing solid biodegradable articles from wheat gluten.

Another object of the present invention is to provide a low temperature molding process that involves drying but not cooking of the wheat gluten, such that the primary structure of the wheat gluten protein remains essentially unchanged.

SUMMARY OF THE INVENTION

In general, the present invention is directed toward a process for making solid biodegradable articles from wheat gluten. Hydrated wheat gluten is provided in the form of a cohesive, elastic dough. The cohesive, elastic dough comprises at least 8% by weight wheat gluten. The cohesive, elastic dough is formed into a shaped article and placed in an environment sufficient to remove excess water from the shaped dough without altering the primary structure of the wheat gluten protein, wherein a solid biodegradable article comprising at least 8% by weight wheat gluten results. Examples of the solid biodegradable articles of the present invention include items such as: food storage containers; food utensils; beverage containers; boxes; toys; biological dressings; medical implants; filters; and biodegradable insulation where each solid biodegradable article comprises at least 8% by weight wheat gluten.

Additional objects and advantages of the invention will be set forth in part in the description which follows, and in part, will be obvious from the description, or may be learned by practice of the invention. The objects and advantages of the invention will be obtained by means of instrumentalities in combinations particularly pointed out in the appended claims.

DETAILED DESCRIPTION OF THE PREFERRED EMBODIMENTS

By the present invention, a low temperature process for making solid biodegradable articles from wheat gluten is presented. In principle, shaped articles are subjected to an environment sufficient to remove excess water such that they are dried into solid biodegradable articles. It is desirable to have some water remain in the shaped article to act as a plasticizer. Therefore, a balance is struck between the drying of the outer portion of the shaped article and diffusion of water from the inside of the shaped article. This balance is achieved by employing low temperatures, controlling the humidity in the environment, or both low temperature and low humidity conditions. By low temperature, it is meant that any heat applied above room temperature (up to a temperature less than about 60° C.) is applied for the purpose of driving off excess moisture and not to alter the primary structure of the wheat gluten protein. In particular, it is undesirable to have the wheat gluten actually cook (as evidenced by inflation of the wheat gluten) or be subject to degradation by heat. Rather, the objective is to provide an environment conducive to drying the shaped article. Hence, an article having a soft interior is not suitable or desirable for the solid biodegradable articles prepared by the process of the present invention. However, some superficial damage to the surface of the article as a result of using low heat during drying is permissible, and one of ordinary skill in the art would realize that.

The process begins by providing hydrated wheat gluten in the form of a cohesive, elastic dough wherein the cohesive, elastic dough comprises at least 8% by weight wheat gluten and wherein the wheat gluten comprises a protein having a primary structure. The wheat gluten used for the present invention is any form of wheat gluten known to one of ordinary skill in the art. Preferably, the wheat gluten comprises at least 10% wheat gluten. More specifically, the wheat gluten comprises about 75% by weight wheat protein, about 10% by weight starch, about 10% by weight moisture, about 5% by weight lipids, and about less than 1% by weight minerals. Such wheat gluten is in the form of a powder and is commercially available and known as Amylum 110 available from Aalst in Belgium or Vital Wheat Gluten available from MGP Ingredients, Incorporated in Atchison, Kans. Alternatively, commercial wheat gluten purified by protein fractionation or extraction is also suitable for use.

When wheat gluten is provided in the form of a powder, any aqueous solvent known to one of ordinary skill in the art may be employed in the present invention as a hydrating agent for the wheat gluten powder. Hence, the hydrating agent is not restricted to water alone but may include various aqueous solvents. Examples of such aqueous solvents include but are not limited to: water; a dilute HCl; a dilute acetic acid; a dilute lactic acid; an aqueous NaOH; aqueous alcohol solutions; urea solutions; chaotropic agents; detergents; salt solutions; and organic solvents capable of swelling protein chains. Preferably, the aqueous solvent is water. The aqueous-based solvent is selected based on the mixing conditions. For example, it may be necessary to decrease the pH to 4 or lower. In such cases, dilute HCl, dilute acetic acid, or lactic acid may be used. Under alkaline conditions, aqueous NaOH may be the solvent of choice. If strong alkaline or acidic conditions exist, the protein structure may be adversely affected. Examples of aqueous alcohol solutions include but are not limited to: alcohol/water mixtures, such as a 70% ethanol or a 50% propanol mixture. Urea solutions are employed when it is desirable to break-up hydrogen bonding. An example of a chaotropic agent is guanidium hydrochloride. Detergents such as sodium dodecyl sulfate, cetyl trimethyl ammonium bromide may also serve as aqueous solvents. Salt solutions are also suitable for this application. Other organic solvents may be used as well, such as ketones, amide solvents, m-cresol, and hexafluoro-isopropanol, provided such solvents are capable of swelling protein chains. Enough of the aqueous solvent must be mixed with the gluten powder to hydrate the powder and form a cohesive, elastic dough. Generally, about 0.1 to about 0.9 parts by weight of an aqueous solvent is added to the gluten powder. More preferably, about 0.5 parts by weight to about 0.75 parts by weight of an aqueous solvent is added to the gluten powder. Any of the solvents may be used in combination with a reducing agent and/or oxidizing agent (such as $KIO_3$) to aid in optimization of dough properties.

Additional additives are added to the formulation to achieve the desired properties of the article. For example, a filler is added to the hydrated wheat gluten. Any filler known to one of ordinary skill in the art may be employed, and preferably, the filler is selected from the group consisting of: inorganic fillers; organic fillers; reinforcement fillers; and natural fillers. Alternatively, the filler is a natural filler such as the shell from a shellfish and, more specifically, pulverized crustacean shells.

Processing additives are also added when desired. In particular, processing additives such as: bleachers; crosslinkers; and plasticizers are added. Specific examples of bleachers include but are not limited to: hydrogen peroxide; ozone; calcium carbonate; and barium peroxide. Crosslinkers include but are not limited to: difunctional aldehyde; p,p'-difluoro-m,m'-di-nitrodiphenylsulfone; 1,5-difluoro-2,4-dinitrobenzene; 1-fluoro-2-nitro-4-azidobenzene; phenol-2,4-disulfonyl chloride; α-naphthol-2,4-disulfonyl chloride; adipate bis-(p-nitrophenyl) ester; carbonyl bis (methionine p-nitrophenyl) ester; tartaryl diazide; tartly bis-(glycylazide); succinate bis-(hydroxyl-succinimide ester); N-(azidonitrophenyl) γ-aminobutyrate hydroxyl-succinimide ester; 1,3-dibromoacetone; p-azidophenacyl bromide; 1,1-bis-(diazo acetyl)-2-phenylethane; 1-diazoacetyl-1-bromo-2-phenylethane; bis-diazo-benzidine; glutaraldehyde; polymethylene (n-3-12)di-imidate; and polythiols. More specific examples of difunctional aldehydes include formaldehydes and glutaraldehydes. Plasticizers such as glycerol and ethylene glycol are also added.

Preservatives are added to prevent mold growth in the product. Such preservatives include but are not limited to: ascorbic acid; sulfites; phenols; calcium chloride; silica gel; propionic acid; acetic acid; inorganic acid; sodium azide; and formaldehyde. In addition, for some applications it is desirable to add a fungicide. Pigments, ultra-violet stabilizers, and antioxidants are added as necessary to meet specific product requirements.

In an alternative embodiment, the hydrated wheat gluten is blended with a biodegradable polymer to form a cohesive, elastic dough. Examples of biodegradable polymers include but are not limited to polylactic acid or polyvinylalcohol. In forming the cohesive, elastic dough, at least 8% by weight of wheat gluten is blended with a biodegradable polymer and water (if needed). More specifically, the proportions of wheat gluten, polymer and water are adjusted to provide a cohesive, elastic dough that comprises at least 8% by weight of wheat gluten.

Once the cohesive, elastic dough is provided, it is formed into a desired shape. The elastic dough is formed into shaped articles by any process known to those having ordinary skill in the art. For example, three-dimensionally shaped articles are formed using a die that is interfaced with standard equipment that is used in forming processes such as: extrusion, injection molding, compression molding, and blow molding. Alternatively, the forming process takes place by way of shaping. Shaping encompasses such activities as flattening or rolling the dough and stamping the article out from the dough. A form press may also be used. The forming process produces a hydrated shaped article that must be further dried in order for the article to achieve full strength. The hydrated shaped articles are similar to those of clay articles that have yet to be fired (often referred to as green ware).

Regardless of the forming process used, in all instances, once the dough is shaped, the hydrated shaped article is placed into an environment sufficient to remove excess water from the shaped article without modifying the primary structure of the wheat gluten protein. An environment sufficient to remove excess water is achieved by either controlling the temperature, the humidity, or both the temperature and the humidity. A sufficient environment would permit the escape of excess water from the interior of the shaped article before the exterior of the shaped article is completely dry. It is desirable to retain some of the water in the interior of the article to serve as a plasticizer for the article. Preferably, the environment has a temperature less than about 60° C. Most preferably, the environment has a temperature less than about 25° C. and, in particular, ranging from about 5° C. to about 20° C. In some instances, the environment may also be a forced air environment that aids in the drying process. Alternatively, a low humidity environment having a temperature less than about 60° C. is also suitable for the present invention. The completion of this step yields a biodegradable article comprising at least 8% by weight wheat gluten.

As further embodiments of the invention, if cracks are present at the surface of the solid biodegradable article, water is applied to the surface of the shaped article to initiate crack healing. The humidity is controlled in the environment to make it conducive to removing excess water without modifying the primary structure of the wheat gluten protein. Lastly, a water repellant coating is applied to the biodegradable article when desired.

A preferred embodiment for making the solid biodegradable articles of the present invention involves compression molding. In this process, the cohesive, elastic dough is flattened and positioned in a male-female mold. The flattened dough is compressed in the mold to form a shaped article which is placed in an environment having a temperature less than about 60° C., preferably less than about 25° C., and within a most preferable range of about 5° C. to about 20° C. Preferably, the elastic dough is compressed using a pressure ranging from about 2 bars to about 25 bars.

Additionally, the male portion of the mold is removed such that the female portion containing the dough remains and the female portion of the mold is returned to the environment having a temperature less than about 60° C., preferably less than about 25° C., or within a most preferred range of about 5° C. to about 20° C. (Alternatively, the female portion of the mold is removed leaving the male portion of the mold having the dough disposed thereon.) When the dough has taken shape, it is removed from the low temperature environment and the male portion of the mold is replaced over the dough. The female portion is then removed leaving the dough disposed on the male portion of the mold. The male portion of the mold is then returned to the low temperature environment until the dough has taken shape. After the male portion is removed from the low temperature environment, the female portion of the mold is place over the male portion of the mold, such that it now contains the dough, the male portion of the mold is removed, and the female portion of the mold containing the dough is returned to the low temperature environment. These steps are repeated until the dough is dry to touch. At that point, the male portion and the female portion of the mold are removed and the shaped article (which is similar to green ware) is placed in the low temperature environment until the shaped article does not yield to touch.

Alternatively, prior to compressing the elastic dough, the dough is placed in an environment having a temperature less than about 60° C., preferably less than about 25° C., or within a most preferable range of about 5° C. to about 20° C., and preferably for about 1 hour when there is no circulating air, before it is positioned in the mold. To prevent cracking during the process, water is applied to the shaped article. Air is circulated in the low temperature environment to enhance drying of the article.

The solid biodegradable articles of the present invention are completely biodegradable and achieve their full strength at temperatures below 60° C. In addition, when no additives are contained in the starting dough, the articles are safe for consumption. At a minimum, the solid biodegradable articles comprise at least 8% by weight wheat gluten and the primary structure of the wheat gluten protein has not been modified.

Example

Materials. Two sources of commercial wheat gluten were used in this study: the first source was commercial wheat gluten (70.2% protein on an "as-is basis" as determined by the Dumas Method (N×5.7)) from Amylum (Aalst, Belgium), while the second source was commercial wheat gluten (75% protein (N×5.7) as reported on the supplier 'Technical Data' sheet) from MGP Ingredients, Inc. (Atchison, Kans., USA).

Experimental. 100 g of wheat gluten powder was combined with roughly 60 g of water. Ingredients were thoroughly mixed for several minutes until the gluten powder was well-hydrated, and the gluten dough had attained maximum strength (as defined by cereal chemists.) Afterwards, the dough was flattened, and draped over a male-egg-carton-shaped-mold. The female counterpart was placed over the dough and the entire assembly was then placed in a refrigerator under a 5 lb weight. After 8 hrs, the weight was removed, along with the female portion of the mold. The open male portion of the mold was returned to the refrigerator to allow the dough to dry over a period of several hours. After 8 hrs, the dough was removed from the male mold and repositioned in the female mold. After another 8 hrs of drying time, the specimen was replaced on the male mold, to allow for uniform drying. When the specimen no longer yielded to touch, it was removed entirely from the mold, and returned to the refrigerator to allow for further drying. When the gluten egg carton had gained sufficient strength, it was removed from the refrigerator for testing. The above procedure renders a bioplastic specimen free of cracks and surface defects.

The above description is only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A solid biodegradable article selected from the group consisting of food storage containers, food utensils, beverage containers, boxes, toys and filters prepared by forming a cohesive, elastic dough consisting essentially of hydrated wheat gluten prepared by mixing at a temperature less than about 60° C. from about 0.1 to about 0.9 parts by weight of a commercial wheat gluten purified by protein fractionation or extraction with from about 0.9 to about 0.1 parts by weight of water, wherein each weight is relative to the total weight of the cohesive, elastic dough; forming the cohesive, elastic dough into a shaped article; and drying the shaped article in an environment having a temperature less than about 25° C.

2. A solid biodegradable article selected from the group consisting of food storage containers, food utensils, beverage containers, boxes, toys and filters prepared by forming a cohesive, elastic dough consisting essentially of hydrated wheat gluten prepared by mixing at a temperature less than about 60° C. from about 0.1 to about 0.9 parts by weight of a commercial wheat gluten purified by protein fractionation or extraction with from about 0.9 to about 0.1 parts by weight of water, wherein each weight is relative to the total weight of the cohesive, elastic dough; forming the cohesive, elastic dough into a shaped article; and placing the shaped article in an environment sufficient to remove excess water from the shaped article.

* * * * *